United States Patent
Nadherny et al.

[11] Patent Number: 6,109,844
[45] Date of Patent: Aug. 29, 2000

[54] CARGO TIE DOWN SYSTEM AND RETAINER USED THEREIN

[75] Inventors: Rudolph Nadherny, Golden, Mo.; Mark Kampf, Crystal Lake, Ill.

[73] Assignee: Ireco, Inc., Chicago, Ill.

[21] Appl. No.: 09/207,848

[22] Filed: Dec. 9, 1998

[51] Int. Cl.[7] ....................................................... B60P 7/08
[52] U.S. Cl. ................ 410/34; 410/32; 410/41; 410/104; 410/97; 410/99; 410/100
[58] Field of Search .................... 410/32, 34, 41, 410/35, 116, 104, 105, 96, 97, 99, 100, 8, 9, 10; 24/130, 116 R; 248/499

[56] References Cited

U.S. PATENT DOCUMENTS

| | | | |
|---|---|---|---|
| 3,209,706 | 10/1965 | Broling | 410/99 |
| 3,312,182 | 4/1967 | Broling | 410/99 |
| 3,426,996 | 2/1969 | Broling | 410/99 X |
| 3,462,137 | 8/1969 | Grube | 410/41 |
| 3,972,500 | 8/1976 | Johnson et al. | 410/104 X |
| 4,043,275 | 8/1977 | Rochester, Jr. | 410/97 |
| 4,487,537 | 12/1984 | Morse | 410/47 |
| 5,538,376 | 7/1996 | Borda | 410/99 |

*Primary Examiner*—Stephen T. Gordon
*Attorney, Agent, or Firm*—Cook, Alex, McFarron, Manzo, Cummings & Mehler, Ltd.

[57] ABSTRACT

A system for tying down cargo on the deck of a transport vehicle such as a cargo of stacked steel plates on a railway flat car. Link chains are used for tying the cargo down. The system utilizes chain retainers secured to the deck or to the bottoms of C-channels recessed in the deck. The retainers are positioned on opposite sides of the cargo and close in to the bottom. A selected link of a length of each of two tie-down chains is inserted into one of two retainers. The free ends of the two chains are fastened together on top of the cargo and then ratcheted to place the chains under tension. The chain retainers are in the form of one-piece castings with a pair of right and left hand uprights with a slot therebetween in which a chain link will fit and pivot in its narrow orientation but not in its wide orientation. A selected link in its wide orientation serves to anchor the lower end of the chain to a chain retainer.

2 Claims, 5 Drawing Sheets

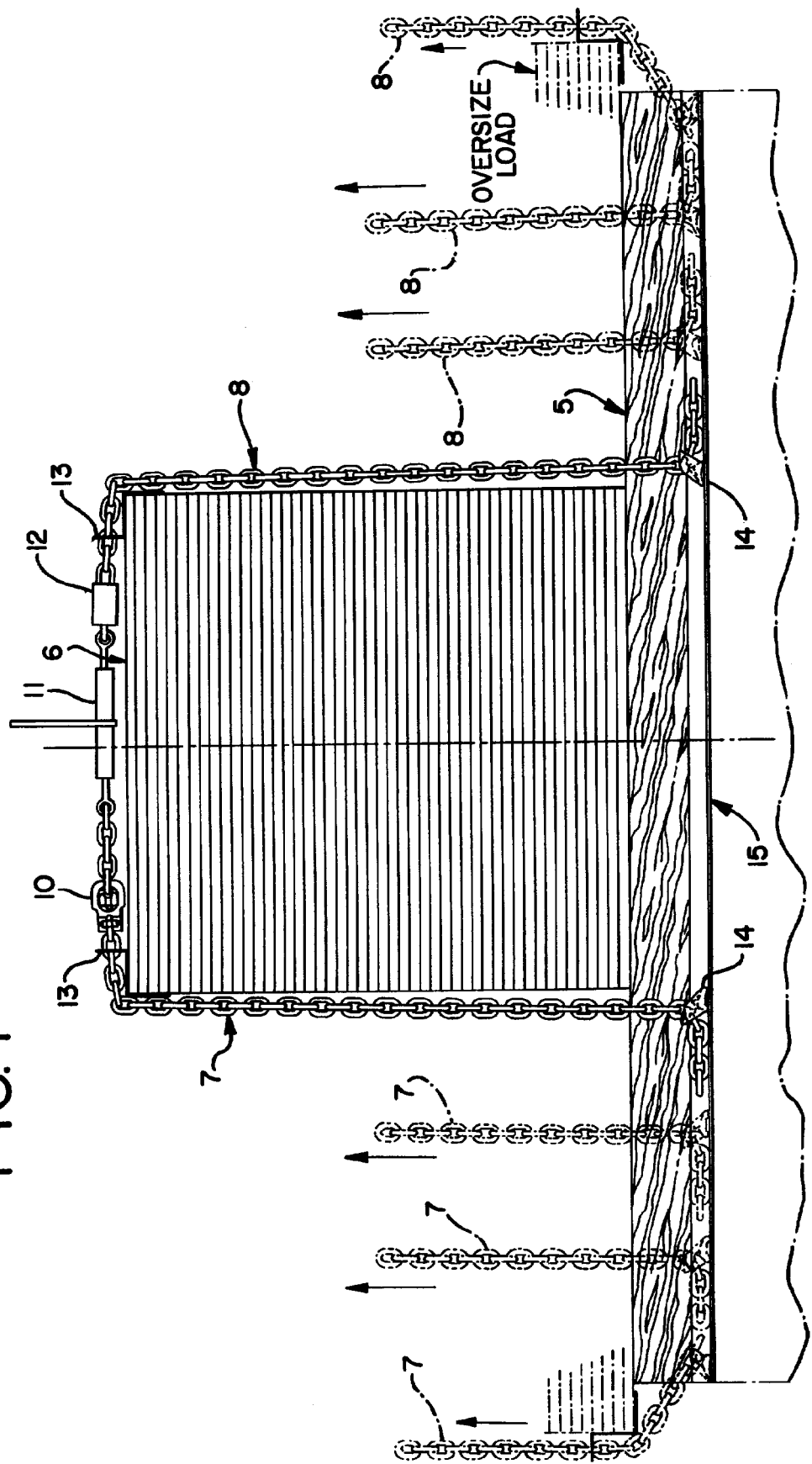

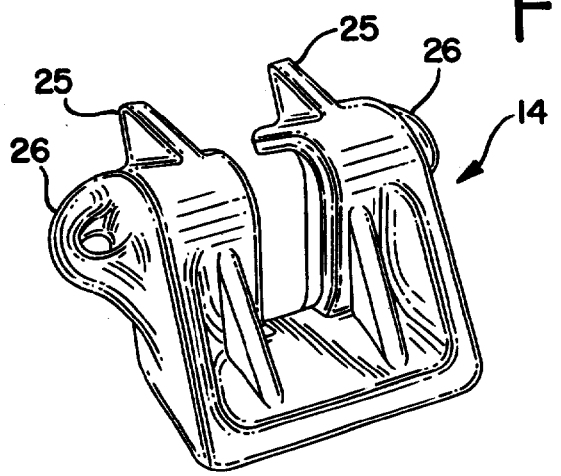
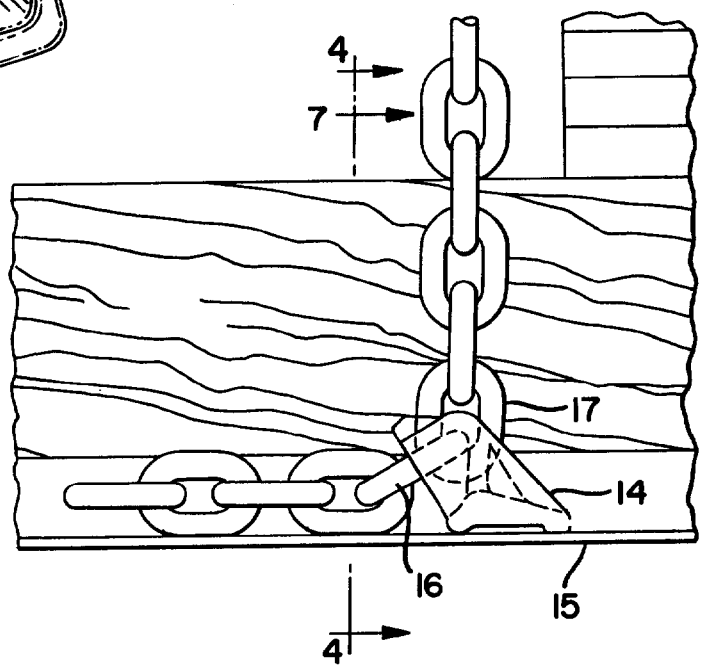
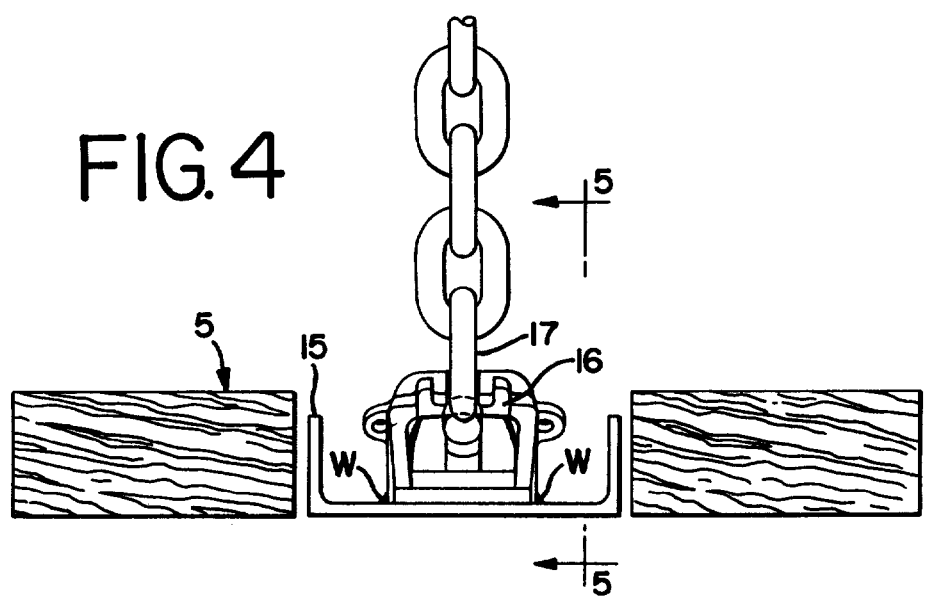

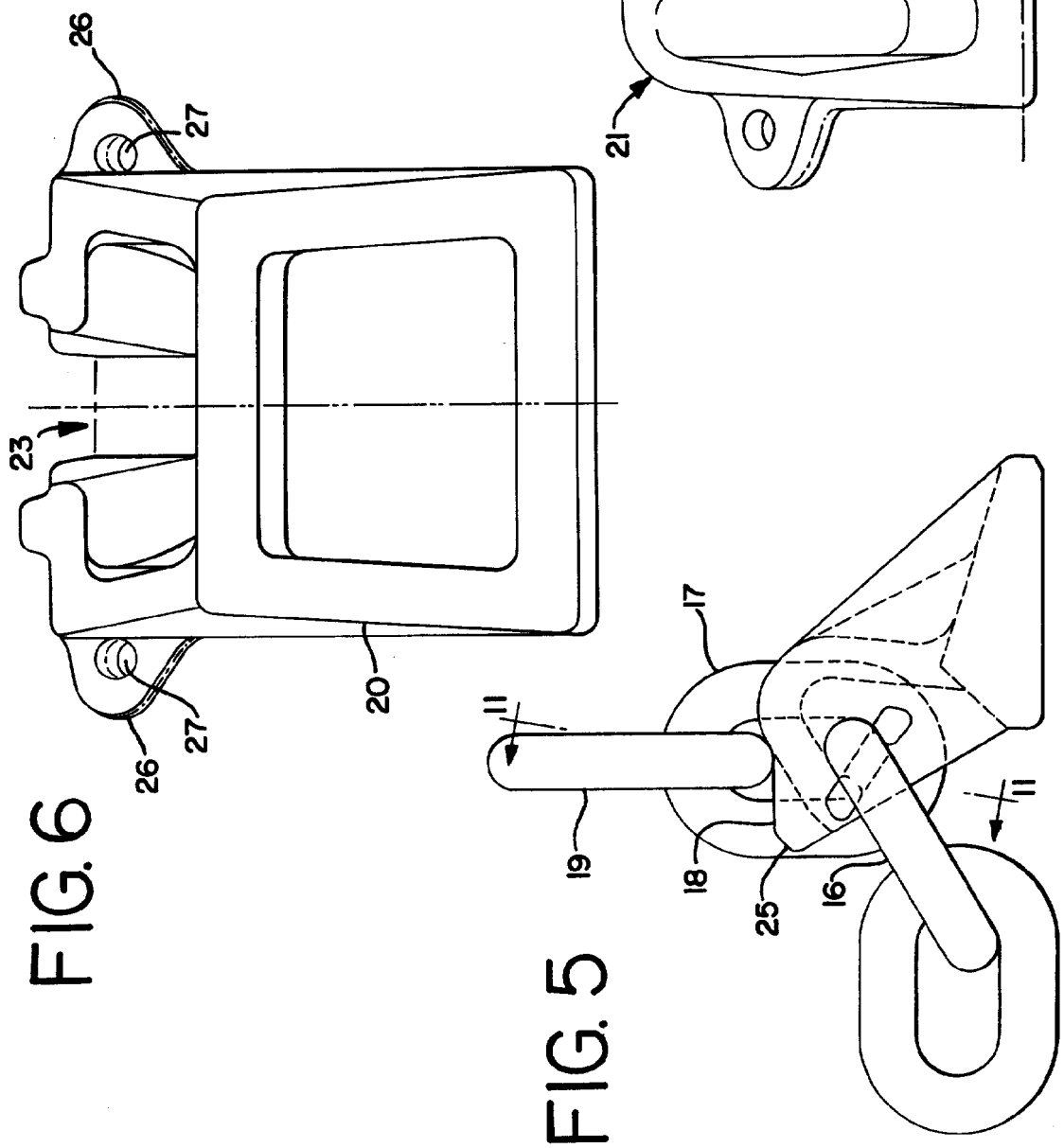

CARGO TIE DOWN SYSTEM AND RETAINER USED THEREIN

BACKGROUND OF THE INVENTION

This invention relates, generally, to a cargo tie down system wherein chains are used to tie down cargoes on the decks of cargo transport vehicles and to novel chain retainers used in the system. The invention has a particular relation to tying down cargo in the form of rectangular stacks of plates or sheets, such as steel plates, on the decks of railway flatcars that have a series of longitudinally spaced open channels extending transversely across the decks in which tie down chains are stowed when not in use.

In the past, chains have been used to tie down cargos, including rectangular stacks of steel plates and the like, on the decks of railway flatcars in the surfaces of which transverse channels are located. Heretofore, each such channel has been provided with lengths of chain one end of which has been secured in the channel with the chains being stowed or laid in the channels when not in use. In use, the lengths of chain are brought up on opposite sides of the cargo and the free ends secured together using a ratchet load binder and a tensioner.

It will be understood that the sizes of various cargoes with respect to both height and width may vary, thereby requiring that the lengths of chain used be sufficiently long so as to accommodate maximum sized cargoes. It is customary to permanently attach the lengths of chains at one end of each to the interiors of the transverse channels so that they cannot be removed but will be readily available for use when required and stowable in the channels when not in use.

For optimum results, particularly when a cargo is in a form of a rectangular stack of sheets or plates laid one on top of another, the bottom end of each length of chain should be placed at least approximately directly underneath one of opposite sides of the cargo so that when the length of chain is pulled taut it will be juxtaposed to the adjacent side of the cargo being tied down. In order to provide for such juxtaposed placement, it will be necessary to secure some form of chain retainer in the transverse deck channels. This requirement can be met either by providing the channels with a plurality of spaced chain retainers or with an arrangement for temporarily positioning a movable chain retainer in different locations in a channel. In either arrangement, it is a practical requirement that the portion of a given length of chain that is in use in tying down a cargo be readily adjustable so that the bottom end of the active length of chain outside of a channel can be readily inserted and removed from its chain retainer.

In view of the foregoing, the object of the invention, generally stated, is the provision of a new and improved cargo tie down system utilizing lengths of chain for tying down the cargo on the decks of cargo transport vehicles, particularly railway flatcars, the decks of which have a plurality of transverse channels in which tie down chains can be stowed when not in use.

An important object of the invention is the provision of new and improved chain retainers which will be secured in the transverse channels in the decks of cargo transport vehicles, such as railway flatcars, and in which selected links of cargo tie down chain may be readily inserted and removed but which will be firmly secured when upward tension is placed on an active length of chain which is being used in tying down cargo.

Other important objects of the invention will be apparent to those skilled in the art from the following description of presently preferred embodiments thereof taken in conjunction with the accompanying drawings wherein:

BRIEF DESCRIPTION OF THE DRAWINGS

FIG. 1 is a schematic view showing the cargo tie down system of the invention, including the improved chain retainers, tying down a cargo of plate steel on the deck of a railway flatcar, and illustrating in broken line the use of the tie down system with wider cargoes;

FIG. 2 is a top perspective view of one of the chain retainers shown in FIG. 1;

FIG. 3 is a fragmentary view on enlarged scale of the portion of FIG. 1 within the broken line circle;

FIG. 4 is a fragmentary sectional view taken on line 4—4 of FIG. 3;

FIG. 5 is a fragmentary side elevational view on enlarged scale taken on line 5—5 of FIG. 4 and illustrating the relationship between certain chain links and the chain retainer when the chain is not under tension;

FIG. 6 is a bottom plan view of the chain retainer shown in FIG. 2;

FIG. 7 is an elevational view of the chain retainer of FIG. 5;

Referring to FIG. 1 the deck of a cargo transport vehicle, such as the deck of a railway flatcar, is indicated generally at 5 with a cargo of plate steel indicated generally at 6 stacked thereon. The cargo 6 is rectangular in shape and is shown tied down by two lengths of chain indicated generally at 7 and 8. The upper ends of the chains 7 and 8 extend over the upper corners of the cargo 6 and are interconnected by a chain shortener link 10, a ratchet load binder 11 and a tensioner 12, all three being of known commercial construction. The upper corners of the stack 6 are protected by corner protectors 13—13 which are slidable on the chains 7 and 8 and stay with the chains.

Figure 9:
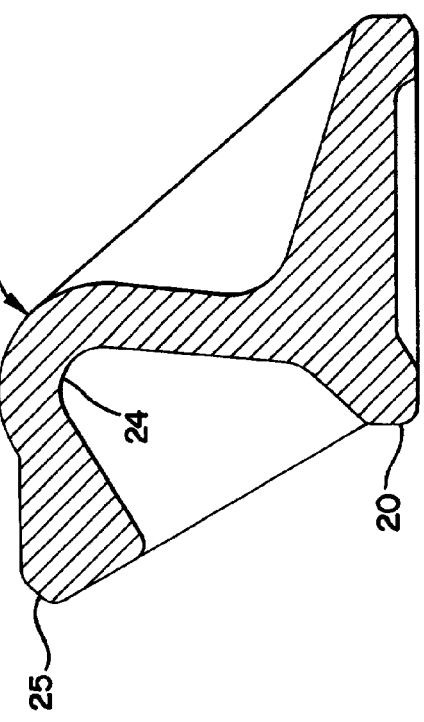
FIG. 9 is a sectional view taken on line 9—9 of FIG. 7.
Figure 10:
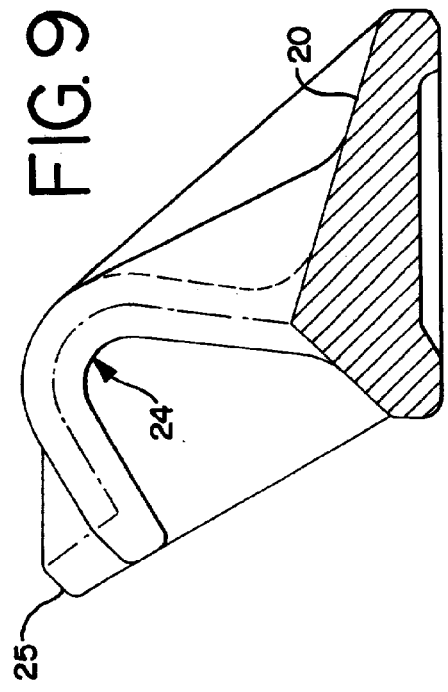
FIG. 10 is a sectional view taken on line 10—10 of FIG. 7.

The lower ends of the chain lengths 7 and 8 are secured approximately directly beneath the opposite sides of the cargo 6 by means of chain retainers indicated generally at 14—14. These chain retainers are secured on the floor or bottom of transversely extending C-channels one of which is indicated generally at 15 in FIGS. 1, 3 and 4.

In FIG. 1, the positions of the chains 7 and 8 in tying down cargoes of greater width than the cargo 6 are shown in broken line, including a cargo of oversize width. In order that the chains 7 and 8 when not in use will be available for tying down cargo they will be stowed within a C-channel 15.

In FIG. 1, the in-use lengths of two of the chains 7 and 8 used in tying down cargo 6 are normally less than the total lengths of these chains whereby the unused lengths lie in the channels 15 as indicated. The in-use lengths of chains 7 and 8 have to be readily adjustable so that they can be placed under tension and maintained in a taut condition. Thus, it is necessary that the chain retainers 14 be able to selectively retain a chain link 16 as illustrated in FIGS. 3–5. Link 16 (FIG. 5) will lie in an inclined plane while the next link 17 will extend upwardly in a generally vertical direction when a chain is in use. The load on the chains 7 and 8 is taken by chain links 16 and the respective retainers 14.

Referring to FIG. 2 and FIGS. 5–11, each chain retainer 14 has a base 20 which will be secured to the floor or bottom of the C-channel 15 by welding W or suitable fastener means of known type (not shown). A pair of uprights indicated generally at 21 and 22 are integrally formed on the top of the base 20 with a slot 23 (FIGS. 6–8 and 11) therebetween. The slot 23 is of such width as to accommodate a chain link 17 only when turned in its narrow direction. The uprights 21 and 22 are left handed and right handed so as to form mirror images with respect to each other and thereby form therebetween a chain link receiving cavity the inner upper end of which is indicated at 24 in FIGS. 9 and 10. The continuity of the cavity is interrupted by the slot 23.

The manner in which two selected links 16 and 17 of each chain 7 and 8 are retained in one of the retainers 14 is illustrated in FIGS. 3–5. The upper end of the lower link 16 fits into the upper end or nose of a cavity 24 while the upper link 17 extends upwardly through the slot 23.

When there is no tension being maintained on a chain 7 or 8, the links 16 and 17 of that chain can be readily released and removed from this particular retainer 14. However, when tension is applied to either chain 7 or 8, its lower link 16 will firmly engage the upper end 24 of the cavity in the retainer and link 17 and the links above will be under tension. In use, the appropriate pair of links 16 will be selected for the size of a particular cargo 6 so that the ratchet load binder 11 and tensioner 12 can be used to maintain each length of chain 7 and 8 taut and under tension. When the time comes for unloading the cargo 6, the tension can be removed and the upper ends of the chains 7 and 8 disengaged at the chain shortener link 10 in the usual manner. Upon disengagement of the upper ends of the chains 7 and 8, the links 16 can be readily released and removed from their respective retainers 14 and the chains stowed in the C-channels 15 until required for another use.

There is an intermediate condition in which the chains 7 and 8 are not disengaged or disconnected but the load or tension on the chains is removed. This condition is illustrated in FIG. 5 where the bottom end of each link 19 next above a link 17 will rest on the horizontal shoulders 18 (FIG. 5) of the ears 25—25 (FIGS. 2, 5 and 8–10). This intermediate condition occurs frequently as when a pair of chains 7 and 8 are being installed and initially tensioned. In this intermediate condition the chains will not drop out of their retainers 14 as they would otherwise be likely to do. This relieves an operator from having to hold each chain in place until it is tensioned.

Figure 8:
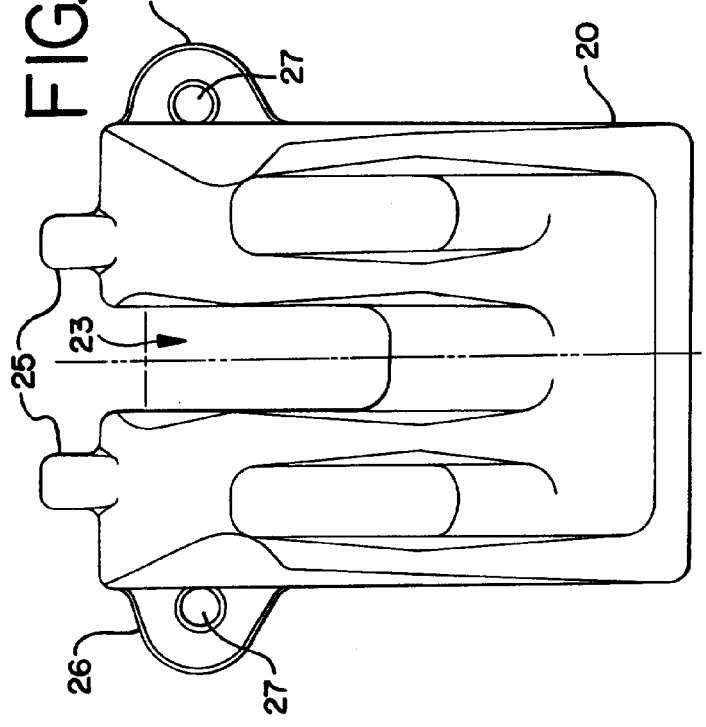
FIG. 8 is a partial elevational and partial top plan view of the chain retainer shown in FIG. 2.
Figure 11:
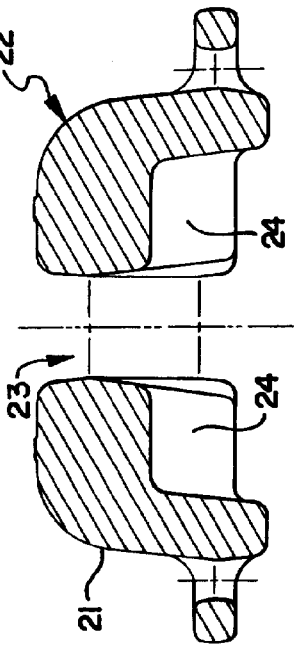
FIG. 11 is a sectional view of the retainer taken on line 11—11 of FIG. 5.

As additional means of securing chains 7 and 8 in place on the retainers 14, the retainers are provided on opposite sides with ears 26—26 having apertures 27—27 (FIGS. 6–8). It will be apparent that a lockwire can be readily threaded or looped through a chain link (e.g. link 17) and a pair of apertures 27 with the ends of the lockwire being twisted or otherwise secured together.

In order to accommodate cargoes of different widths, a plurality of the retainers 14 may be mounted or secured in each C-channel 15 at appropriately spaced locations as indicated in FIG. 1. Alternatively, only a single retainer 14 may be used for each length of chain 7 or 8 and provision made for selectively positioning and securing that retainer at different desired locations in its C-channel 15.

Figure 12:
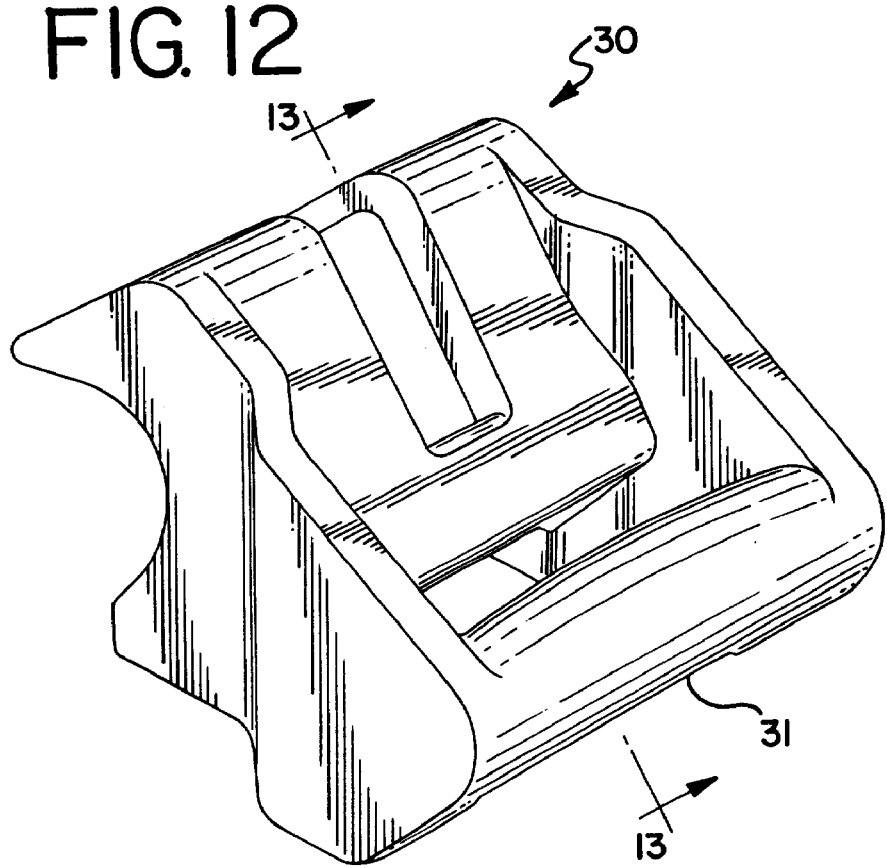
FIG. 12 is a top perspective view of a second embodiment chain retainer.
Figure 13:
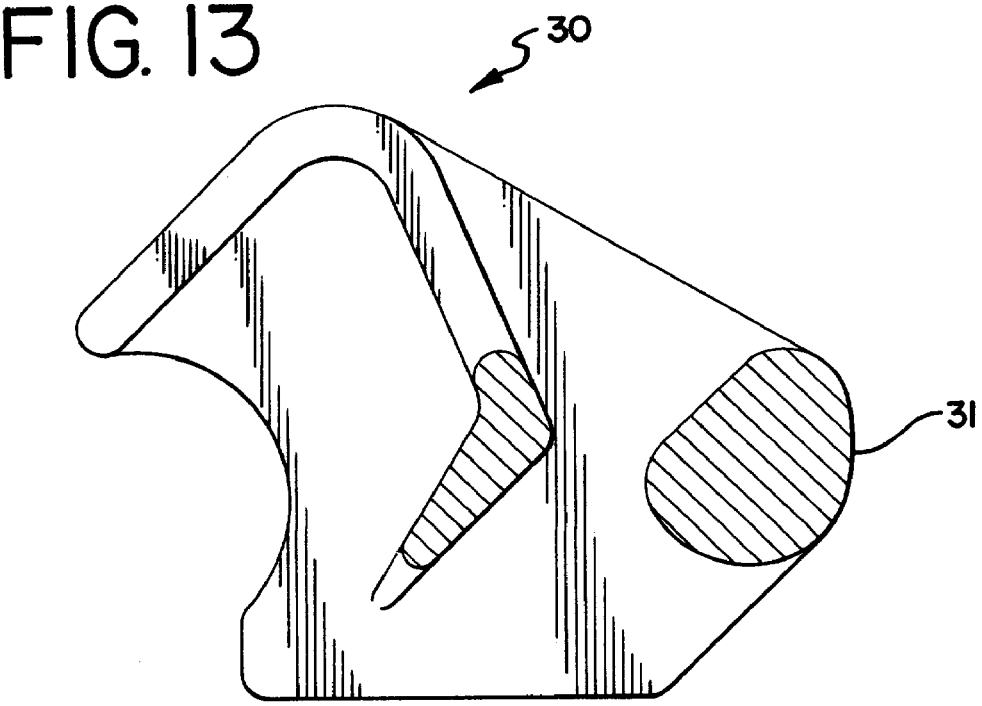
FIG. 13 is a sectional view taken on line 13—13 of FIG. 12.

Referring to FIGS. 12 and 13 a link chain retainer is indicated generally at 30 therein which has provision for accommodating a steel band or woven web as well as a chain. The base of the retainer 30 has an integrally formed bar 31 extending thereacross. One end of a steel band or a strong weather resistant web can be secured around the bar 31 and the band or web utilized in known manner to secure a cargo or lading in place.

While the chains 7 and 8 will usually extend upwardly from the retainers 14 in an approximately vertical plane aligned with the retainers, they are free to tilt in any direction as may be required to compensate for mis-alignment.

It will be understood that in light of the foregoing disclosure those skilled in the art will be able to make changes and provide other embodiments of the invention without departing from the spirit and scope thereof as defined in the appended claims.

What is claimed is:

1. A system for tying down an upstanding cargo on the deck of a cargo transporting vehicle, comprising, at least one upwardly open channel in the deck extending transversely to two opposite sides of said cargo, at least one length of chain stowable in said channel when not in use tying down cargo, a chain retainer secured in said channel approximately directly underneath one of said two opposite sides of said cargo and having a formation in and by which two links of said chain are retained when said chain is tensioned and from which said two links are releasable upon removal of said tension therefrom, and chain tensioning means operatively connected with said length of chain upwardly of said retainer so as to maintain said length of chain taut adjacent one of said opposite sides of said cargo.

2. A system for tying down on the deck of a cargo transporting vehicle a cargo of horizontally stacked sheets that has a generally rectangular profile in at least one direction, comprising, at least one upwardly open channel in said deck extending transversely to said one direction, at least one length of tie down chain stowable in said channel when not in use tying down cargo, a chain retainer secured in the floor of said channel approximately directly beneath one of two opposite vertical sides of said cargo and in and by which two links of said chain are retained when said length of chain is tensioned along and adjacent said one vertical side and from which said two links are releasable upon release of said tension, and chain tensioning means operatively connected to said length of chain so as to maintain said length of chain taut adjacent said cargo.

* * * * *